United States Patent Office 2,809,720
Patented Oct. 15, 1957

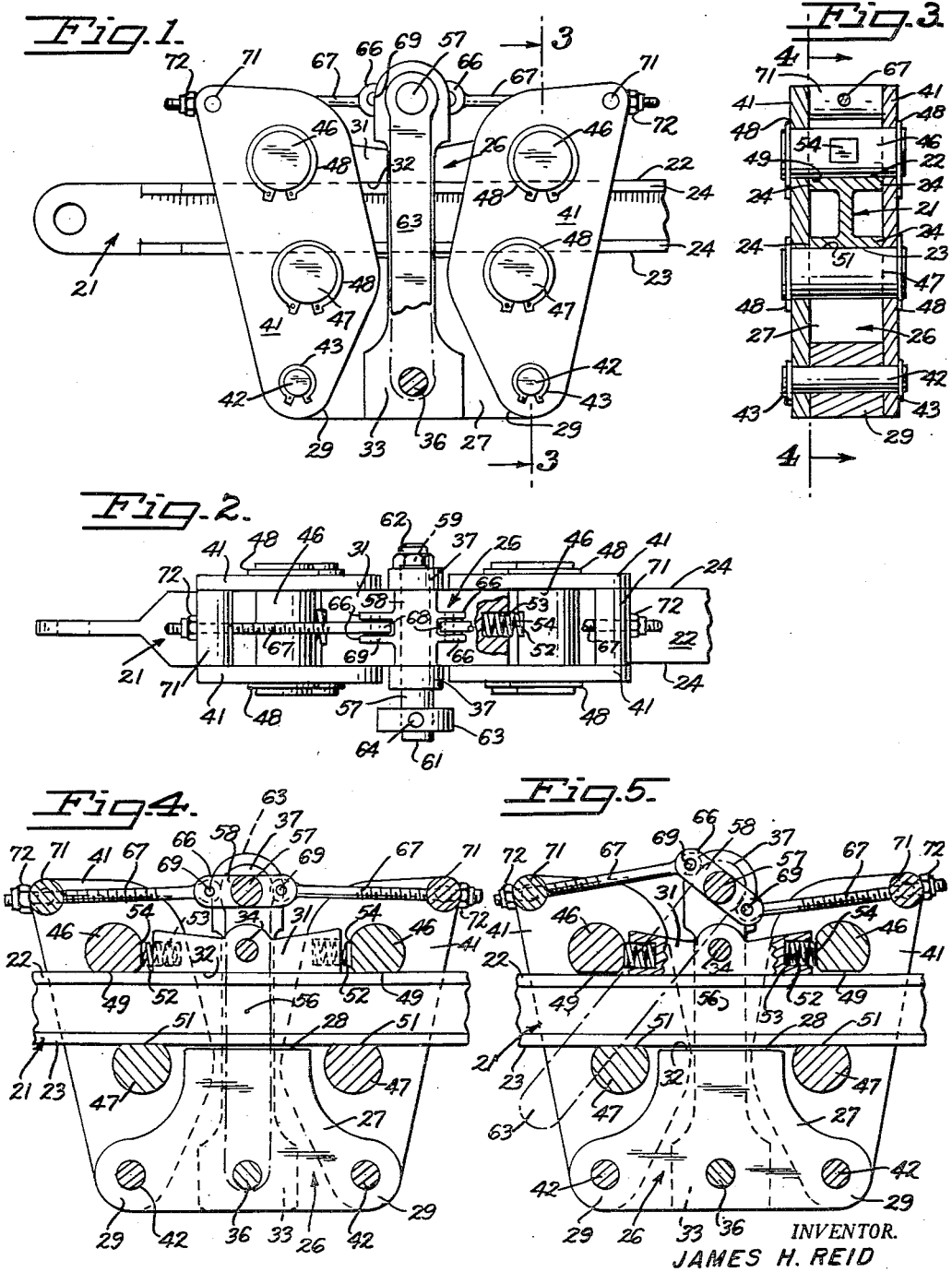
Oct. 15, 1957     J. H. REID     2,809,720
LOCKING DEVICE MECHANISM
Filed Nov. 10, 1955     2 Sheets-Sheet 1
INVENTOR.
JAMES H. REID
BY
Townsend, Townsend and Hoppe
ATTORNEYS

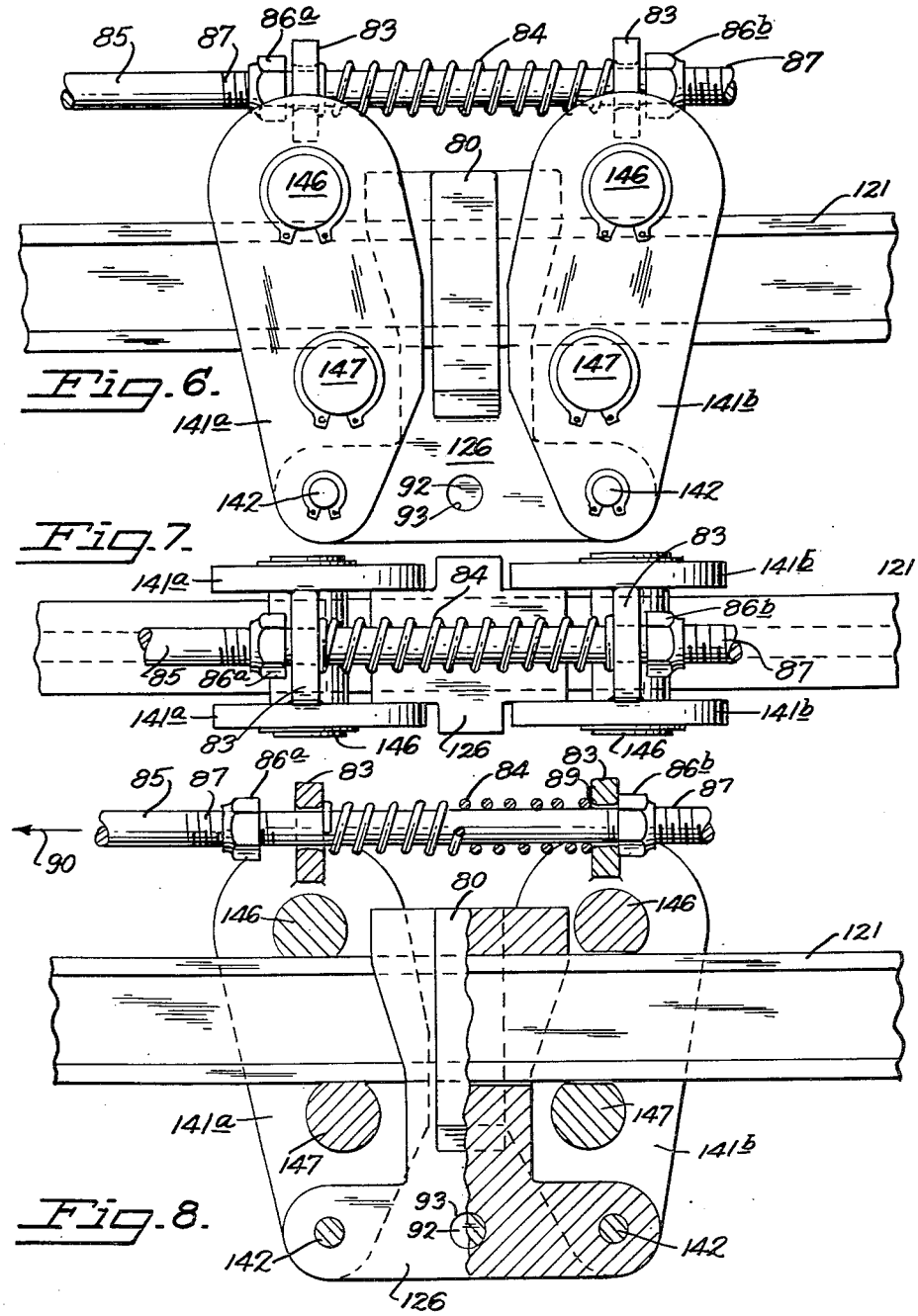

2,809,720

LOCKING DEVICE MECHANISM

James H. Reid, Los Angeles, Calif., assignor to Reid Engineering Company, Burbank, Calif., a partnership Application November 10, 1955, Serial No. 546,035

12 Claims. (Cl. 188—67)

This invention relates to a new and improved locking device. The present invention finds particular utility as a means for adjustably locking in position a slidable seat, such as an airplane pilot's seat.

One of the particular features and advantages of the present invention is the fact that the device can be locked in any desired position with a wide range of adjustability afforded the user.

Another feature and advantage of the invention is the fact that the device locks against forces applied in either direction, which is of particular importance inasmuch as the pilot's seat is held in place during rapid acceleration or deceleration.

Still another feature of the invention is the facility with which the device may be unlocked to permit movement of the seat relative to its stationary support.

The present invention provides means whereby severe forces tending to move the locked seat member are resisted and the construction and operating principle of the lock are such that application of such forces tends more securely to lock the device in place.

Other objects of the present invention will become apparent upon reading the following specification and referring to the accompanying drawings in which similar characters of reference represent corresponding parts in each of the several views.

In the drawings:

Fig. 1 is a side elevation partly broken away to reveal the interior construction;

Fig. 2 is a top plan;

Fig. 3 is a transverse vertical sectional view taken substantially along the line 3—3 of Fig. 1;

Fig. 4 is a longitudinal vertical sectional view taken substantially along line 4—4 of Fig. 3 and showing the device in one position of adjustment;

Fig. 5 is a view similar to Fig. 4 showing the device in another position of adjustment;

Fig. 6 is a side elevation view of another embodiment of the invention showing the device in one position of adjustment;

Fig. 7 is a top plan view of Fig. 6; and

Fig. 8 is a similar view to Fig. 6 showing the device in another position of adjustment and partly broken away to reveal the interior construction.

The present invention finds particular application in locking in place an aircraft pilot's seat (not shown), but it will be understood that the invention has application to other uses wherein it is desired to lock a slidable element in position. In the following description of the invention the device is illustrated and described as mounted for horizontal sliding movement. For convenience, the terms "horizontal" and "vertical" in the description of the invention are used in that sense. However, the force of gravity plays a very minor part in the operation of the device and hence the position may be changed without affecting the operation.

The locking device hereinafter described slides horizontally on a bar 21 which is preferably H-shaped in cross-section, with the H rotated 90°. Such a bar has an upper gripping surface 22 and lower gripping surface 23 and side edges 24. Bar 21 is secured to a stationary support in any convenient manner (not shown).

Horizontally slidable along the bar 21 is a lock body 26. Body 26 comprises a lower portion 27 having its upper edge 28 parallel to and spaced below lower gripping surface 23 and having longitudinally outwardly diverging extensions 29 at its lower end. The thickness of the lower portion 27 is substantially equal to the distance between the side edges 24 of bar 21. On the opposite side of bar 21 from lower lock body portion 27 is an upper lock body portion 31 having its lower edge 32 parallel to and spaced slightly above upper gripping surface 22 of bar 21. Connecting body portions 27 and 31 are a pair of narrow vertical sides 33 which extend outside edges 24 of bar 21 and which are connected to body portions 27 and 31 by means of upper connecting pin 34 and seat drive pin 36. The sides 33 have upward extensions 37 which rise above the level of upper lock body portion 31 for a purpose which hereinafter appears. The seat drive pin 36 is connected to the seat structure and moves therewith so that the seat slides parallel to bar 21, the lock body 26 moving along the bar 21 as the seat slides. The structure hereinafter described functions to lock the lock body 26 relative to the bar 21.

Accordingly there are provided four shoe mounting plates 41 which are disposed in pairs, the members of each pair being on opposite sides of bar 21 and the pairs on opposite ends of lock body 26. Each shoe mounting plate 41 is connected at its lower end by a shoe mounting pin 42 to one of the longitudinal extensions 29 of the lower lock body portion 27. The plates 41 partially bear against the flat surfaces of lower lock body portion 27, which insures that the plates move substantially parallel to the direction of bar 21. The plates 41 are held in position by split rings 43 on their outer surfaces which snap into grooves (not shown) in the ends of pins 42. Each pair of shoe mounting plates 41 carries an upper shoe 46 and a lower shoe 47 disposed above and below bar 21, respectively. Preferably the lower shoes 47 are spaced inwardly relative to the upper shoes 46, rather than being directly below the upper shoes 46. The shoes 46 and 47 are formed of round stock and are rotatable relative to the mounting plates 41. The shoes 46 and 47 are secured in place by split rings 48 on the outer surface of plates 41 which snap into grooves (not shown) in the ends of shoes 46 and 47. Each upper shoe 46 has a flattened bearing surface 49 at its bottom which slides along upper gripping surface 22 of bar 21. Similarly each lower shoe 47 has a bearing surface 51 at its top which bears against the lower gripping surface 23 of bar 21. The shoe mounting plates 41 are biased for outward pivotal movement about pins 42 by means of helical springs 52 which are held in recesses 56 in upper lock body portion 31 and bear against flattened spring bearing surfaces 54 on upper shoes 46. Accordingly the action of springs 52 is to hold the parts in the position shown in Fig. 4, wherein the bearing surfaces 49 and 51 are in gripping engagement with surfaces 22 and 23 of bar 21. It is further apparent that forces applied to seat drive pin 36 cause the shoes 46 and 47 to grip the bar more securely, inasmuch as such forces are applied below the center 56 which lies midway between the centers of the four shoes.

In order to release the lock, a lock release control pivot shaft 57 extends between the upward extensions 37 of sides 33, said shaft 57 carrying sleeve 58 between the extensions 37 and having outwardly projecting ends 59 and 61, one end 59 being threaded and held in position by nut 62 and the other carrying handle 63 connected thereto by set screw 64. Sleeve 58 is provided with two pairs of longitudinally extending clevis ears 66 and the various parts are so arranged that when handle 63 is turned, the clevis ears pivot about shaft 57 as an axis. Threaded rods 67 are formed with eyes 68 at their inner ends which are received between the clevis ears 66 and held in place by clevis pins 69. The opposite ends of rods 67 pass through holes in rotatable pins 71 which extend between the outer upper corners of each pair of shoe mounting plates 41. Nuts 72 on the outer ends of rods 67 are provided for adjustment so that when the handle 63 is in the position shown in Fig. 4, no inward pressure is applied to the shoe mounting plates 41. However, when the handle 63 is twisted to the position shown in Fig. 5, the rods 67 draw the shoe mounting plates 41 inwardly against the pressure of springs 52 thereby causing the shoes 46 and 47 to be released from gripping contact with the bar 21 and permitting the lock body 26 to slide relative to the bar 21. Upon release of handle 63, springs 52 return the parts to the position shown in Fig. 4.

Accordingly, in operation, when no turning movement is applied to the handle 63, the springs 52 cause the shoes 46 and 47 to engage the bar 21 and resist sliding movement of the lock body 26 relative to the bar 21. If a force is applied to the seat drive pin 36, movement is resisted by reason of the eccentricity of pin 36 relative to center 56 midway between the shoes. A very severe force may thus be resisted. When it is desired to alter the position of lock body 26 relative to bar 21, the operator turns handle 63 which draws the shoe mounting plates 41 inwardly and by reason of the fact that the plates 41 are mounted on pins 42 located as shown in the drawings, the shoes 46 are released from contact with bar 21, thereby permitting sliding movement in either direction.

Referring to Figs. 6, 7 and 8, a locking device similar to the locking device hereinabove described is provided on a bar 121 identical to bar 21. Two pairs of shoe mounting plates 141a and 141b are provided for the device similar to shoe mounting plates 41 and having upper shoes 146 and lower shoes 147 identical to shoes 46 and 47. The plates 141 are pivotally mounted on a mounting pin 142 on a lock body 126. The locking device is connected to a frame member or support such as a seat structure or the like by a drive pin 92 mounted within a mounting hole 93 in lock body 126 to enable the controlled member such as a seat to slide parallel to bar 121. Lock body 126 is provided with a stop member 80 on each side of body 126 to limit linear motion of plates 141.

Each pair of plates 141 is provided with a bracket 83 rigidly fixed and projecting upwardly from the top portion of the plates. The brackets are each provided with holes 89. A control rod 85 is disposed slidably through holes 89 so the rod is positioned parallel to the longitudinal axis of bar 121. Rod 85 is provided with threaded sections 87 and stroke adjusting nuts 86a and 86b which coact with brackets 83 to move shoes 146 and 147 to the unlocked condition upon movement of the rod. The nuts are adjusted to allow clearance between the nuts and brackets 83 when rod 85 is in a normal or locked position so that plates 141a and 141b are allowed to move to the full locked position. A shoe biasing spring 84 is provided between brackets 83 on rod 85 to bias plates 141 apart.

In the operation of this device spring 84 forces the two pairs of shoe mounting plates 141 apart causing shoes 146 and 147 of both plates 141 to engage bar 121 and resist sliding movement of lock body 126 relative to bar 121. If force is applied to pull control rod 85 in the direction indicated by arrow 90 of Fig. 8, nut 86b pushes against bracket 83 to move shoe mounting plates 141b against stop member 80. In this condition the upper shoe 146 and lower shoe 147 of plate 141b are no longer in position to lock the body to the bar. However, as upper shoe 146 and lower shoe 147 of shoe mounting plate 141a still remain in body and bar locking condition, the mechanism effectively allows motion of lock body 126 along bar 121 in one direction, as indicated by arrow 91, but still prevents movement of the body in the other direction. If control rod 85 is pushed in a direction opposite to the direction indicated by arrow 90, the shoes associated with plates 141b will be in locked engagement with bar 121 and the shoes located on plates 141a will be out of locking engagement therein allowing body 126 to move in a direction opposite the direction indicated by arrow 91.

Therefore via the control rod actuating assembly it is possible to allow lock body 126 to move in one direction or the other corresponding to the direction in which control rod 85 is moved. It is understood that the lock body and the bar may move relative to one another. Thus the body may be fixed and the bar slide therein, or vice versa.

Although the foregoing invention has been described in some detail by way of illustration and example for purposes of clarity of understanding, it is understood that certain changes and modifications may be practiced within the spirit of the invention and scope of the appended claims.

I claim:

1. A locking control device comprising a bar having two opposed, substantially flat sides, a structure movable on said bar, and locking means carried on said structure and operable to lock said structure and bar against relative movement, said locking means comprising a pair of mounting members each pivotally mounted on said structure, each said mounting member having at least two shoes, one said shoe being positioned on one side of said bar and the other on the opposite side of said bar, said shoes being in close proximity to said bar, means resiliently biasing said mounting members to pivot said members relative to said structure to bring said shoes into gripping contact with said bar to lock said bar and structure against relative movement, and unlocking means operable to pivot at least one of said members in a direction opposite that toward which it is biased by said resilient means to bring at least two said shoes out of gripping contact with said bar.

2. A locking control according to claim 1 in which each said shoe comprises a cylindrical member flattened along at least a part of its cylindrical surface, said flattened portion of said cylindrical member facing said bar.

3. A locking member according to claim 1 in which said mounting member comprises a pair of plates on opposite sides of said bar, and in which each said shoe comprises a cylindrical member extending between and connecting said pair of plates, said cylinder member being flattened along at least a portion of its cylindrical surface, said flattened portion of said cylindrical member facing said bar.

4. A locking control device comprising a bar having a first and an opposite second gripping surface, a lock body slidable relative to said bar, said lock body having a first portion and a second portion on opposite sides of said bar, and means extending around at least one side of said bar connecting said portions together, a first and a second shoe-mounting member each pivotally connected to said first portion of said lock body, each said member having a first shoe in juxtaposition with said first surface and a second shoe in juxtaposition with said second surface of said bar, means resiliently biasing said members apart to bring said shoes into gripping engagement with said surfaces to lock said body relative to said bar, control means connected to each of said members, and means for actuating said control means to move at least one of said members toward the other to disengage at least two said shoes from said surfaces.

5. A device according to claim 4 in which said control means comprises a shaft and which further has means connecting said shaft to each of said members comprising a clevis on said shaft, rods connected to said clevis, and means attaching said rods to said members.

6. A device according to claim 5 which further comprises adjustable means carried by said rods and arranged to abut said means attaching said rods to said members upon movement of said shaft to unlocking position.

7. A device according to claim 4 and wherein means is provided for mounting said control means slidably relative to said shoe mounting members and said shoe biasing means is carried by said control means.

8. A device according to claim 7 and wherein said control means is disposed longitudinally of said bar, and adjustable connecting means to connect said control means and one said shoe mounting member upon movement of said control means to unlocking position.

9. A locking device comprising a bar, a lock body, said bar and body relatively slidable with respect to each other, a pair of shoe-mounting members each pivotally connected to said body, each said member having a first shoe in juxtaposition with one surface of said bar and a second shoe in juxtaposition with an opposite surface of said bar, means resiliently biasing said members apart to bring said shoes into gripping engagement with said surfaces of said bar to lock said bar and body against relative movement, a shaft on said body transverse to said bar, connecting means connecting said shaft to each of said members, and means for turning said shaft to move said members toward each other to disengage said shoes from said surfaces.

10. A device according to claim 9 in which said connecting means comprises adjustable means.

11. A device according to claim 9 in which at least one said shoe comprises a cylinder carried by said member and flattened along at least a portion of its surface, the flattened portion of said cylinder facing said bar.

12. A locking device comprising a bar, a lock body, said bar and body relatively slidable with respect to each other, a pair of shoe mounting members each pivotally connected to said body, each said member having a first shoe in juxtaposition with one surface of said bar and a second shoe in juxtaposition with an opposite surface of said bar, means resiliently biasing said members apart to bring said shoes into gripping engagement with said surfaces of said bar to lock said bar and body against relative movement, a control shaft, means to connect said shaft to each said shoe mounting member, and means including said shaft to move a shoe mounting member relative to said bar.

References Cited in the file of this patent

UNITED STATES PATENTS

| | | |
|---|---|---|
| 1,606,840 | Koenigkramer | Nov. 16, 1926 |
| 2,153,593 | Ronning | Apr. 11, 1939 |
| 2,189,244 | Gilbert | Feb. 6, 1940 |
| 2,628,070 | Polselli et al. | Feb. 10, 1953 |